United States Patent
Park

(10) Patent No.: US 10,520,318 B2
(45) Date of Patent: Dec. 31, 2019

(54) METHOD AND SYSTEM FOR PROVIDING MAP DATA OF NAVIGATION DEVICE

(71) Applicant: ENGIS TECHNOLOGIES, INC., Seoul (KR)

(72) Inventor: Yong Sun Park, Seoul (KR)

(73) Assignee: ENGIS TECHNOLOGIES, INC., Seoul (KR)

(*) Notice: Subject to any disclaimer, the term of this patent is extended or adjusted under 35 U.S.C. 154(b) by 40 days.

(21) Appl. No.: 15/317,307

(22) PCT Filed: Jun. 5, 2015

(86) PCT No.: PCT/KR2015/005637
§ 371 (c)(1),
(2) Date: Dec. 8, 2016

(87) PCT Pub. No.: WO2015/190755
PCT Pub. Date: Dec. 17, 2015

(65) Prior Publication Data
US 2017/0122747 A1    May 4, 2017

(30) Foreign Application Priority Data
Jun. 9, 2014 (KR) .................. 10-2014-0069089

(51) Int. Cl.
G01C 21/32 (2006.01)
G06F 16/29 (2019.01)
(Continued)

(52) U.S. Cl.
CPC ............ G01C 21/32 (2013.01); G01C 21/26 (2013.01); G06F 16/29 (2019.01); G06F 16/951 (2019.01);
(Continued)

(58) Field of Classification Search
CPC combination set(s) only.
See application file for complete search history.

(56) References Cited

U.S. PATENT DOCUMENTS

2007/0049260 A1*  3/2007  Yuhara ............... G01C 21/3694
                                                           455/414.3
2013/0080580 A1   3/2013  Nagai et al.

FOREIGN PATENT DOCUMENTS

EP    1429263 A1    6/2004
EP    1909068 A2    4/2008
(Continued)

OTHER PUBLICATIONS

International Search Report for PCT/KR2015/005637 dated Aug. 3, 2015.
(Continued)

Primary Examiner — Rami Khatib
(74) Attorney, Agent, or Firm — Sughrue Mion, PLLC

(57) ABSTRACT

Disclosed is a method and system for providing map data of a navigation device. The system comprises: a server for comparing, for each mesh, old version map data and new version map data, generating delta data by extracting only changed spatial data from the meshes, and providing an update of the map data compressed and stored in a navigation device on the basis of the delta data; and the navigation device for receiving a delta file and a delta file header from the server, decompressing the compressed file header included in the old version map data, and extracting only the compressed data block included in an update item in the old version map data by referring to the decompressed file header and the delta file header, the navigation device being built in a car.

7 Claims, 13 Drawing Sheets

(51) Int. Cl.
    *G06F 16/951*    (2019.01)
    *G06F 17/00*     (2019.01)
    *G06T 11/00*     (2006.01)
    *G01C 21/26*     (2006.01)
    *G08G 1/0969*   (2006.01)

(52) U.S. Cl.
    CPC .............. *G06F 17/00* (2013.01); *G06T 11/00* (2013.01); *G08G 1/0969* (2013.01)

(56) References Cited

FOREIGN PATENT DOCUMENTS

| | | |
|---|---|---|
| JP | 2009-128162 A | 6/2009 |
| KR | 10-2003-0055918 A | 7/2003 |
| KR | 10-2004-0056934 A | 7/2004 |
| KR | 10-2006-0074601 A | 7/2006 |
| WO | 2007/116210 A1 | 10/2007 |
| WO | 2008/007794 A1 | 1/2008 |

OTHER PUBLICATIONS

Communication dated Jun. 25, 2018, issued by the European Patent Office in counterpart European Application No. 15806678.7.

* cited by examiner

FIG. 5

| | Mesh | Attribute data |
|---|---|---|
| Block NO.1 | Mesh NO.1 | Road network NO.1<br>Background NO.1<br>Search NO.1<br>Search NO.2 |
| | Mesh NO.2 | Road network NO.2<br>Background NO.2<br>Search NO.3<br>Search NO.4 |
| | Mesh NO.3 | Road network NO.3<br>Road network NO.4<br>Search NO.3<br>Search NO.5<br>Search NO.6<br>Search NO.7 |
| ⋮ | ⋮ | ⋮ |
| Block NO.1001 | Mesh NO.1 | Road network NO.1<br>Background NO.1<br>Background NO.2<br>Search NO.1<br>Search NO.2<br>Search NO.3 |
| | Mesh NO.2 | Road network NO.2<br>Background NO.3<br>Background NO.4<br>Search NO.4<br>Search NO.5<br>Search NO.6 |
| | Mesh NO.3 | Road network NO.3<br>Search NO.7 |
| ⋮ | ⋮ | ⋮ |

FIG. 8

| Version | Data block | Mesh | Attribute data |
|---|---|---|---|
| Version 1 | Block NO. 15 | Mesh NO.2 | Road network NO.4<br>Background NO.6 |
| ⋮ | ⋮ | ⋮ | ⋮ |
| Version 4 | Block NO. 1001 | Mesh NO.1 | Road network NO.1<br>Background NO.1<br>Search NO.1<br>Search NO.2 |
| | | Mesh NO.2 | Road network NO.2<br>Search NO.3 |
| Version 5 | Block NO. 52 | Mesh NO.4 | Background NO.7<br>Search NO.15 |
| Version 6 | Block NO. 204 | Mesh NO.7 | Road network NO.7<br>Background NO.8<br>Search NO.15<br>Search NO.16 |
| | | Mesh NO.8 | Road network NO.8<br>Background NO.9<br>Search NO.17<br>Search NO.18 |
| | Block NO. 205 | Mesh NO.1 | Road network NO.1<br>Search NO.1 |
| Version 7 | Block NO. 1024 | Mesh NO.4 | Road network NO.4<br>Background NO.4<br>Search NO.8<br>Search NO.9 |
| | | Mesh NO.5 | Road network NO.5<br>Search NO.10 |

METHOD AND SYSTEM FOR PROVIDING MAP DATA OF NAVIGATION DEVICE

TECHNICAL FIELD

At least one example embodiment relates to a method and system for providing map data of a navigation device, and more particularly, to a method and system for providing map data of a navigation device that may provide update of map data compressed and stored in a navigation device, based on delta data.

RELATED ART

A navigation device embedded in a vehicle may guide a driver using a current route of a vehicle and a final destination route based on map data that includes roads, buildings, facilities, mountains, sea, and other geographical features.

The navigation device may be embedded in a ship, an airplane, etc., in addition to a vehicle, and may provide a current route and a final destination route.

In general, the navigation device may provide an optimal route to a final destination in a visual and auditory manner by storing map data and by matching the stored map data and location information received from a global positioning system (GPS).

However, the navigation device may provide an optimal route to an inaccurate final destination due to various modifications, such as newly building or changing roads, etc., for example, newly building or changing roads due to a newly built building and facility, newly building roads along the mountains and the sea, etc.

In the recent times, a navigation device that updates various modifications, such as newly building or changing roads, etc., is being developed. In detail, an update scheme may be a scheme of collectively updating the entire map data based on a wired/wireless communication network.

However, since the aforementioned update scheme collectively updates the entire map data based on the wired/wireless communication network, a driver may have some burdens due to large wired/wireless communication cost and a long transmission time and installation time used for update.

Also, the aforementioned update scheme may not guarantee additional data storage space of the navigation device and load burdens of the navigation may be aggravated. In addition, a probability that a system error occurs in the navigation may increase.

DETAILED DESCRIPTION

Technical Subjects

At least one example embodiment provides a method that may update map data stored in a navigation device in a significantly limited condition, similar to updating other original parts embedded in a vehicle.

At least one example embodiment also provides a specialized map data providing method since a navigation device is embedded in a vehicle and, in this aspect, a user may not readily update the navigation device, a vehicle owner needs to save an amount of time used for updating, and a device has an insufficient memory space.

Solutions

According to an example embodiment, there is provided a server to provide map data of a navigation device, the server including a mesh divider configured to divide entire map data into irregular meshes based on density of spatial data that constitutes a map; a section constructor configured to construct a data section by sectioning spatial data included in each of the meshes; a table generator configured to classify the data section based on a data block with a preset size, and to generate a table that includes metadata for each data block; and an update provider configured to provide update of map data that is compressed and stored in the navigation device based on delta data. The data block is the same data as the data block that is compressed and stored in the navigation device.

The section constructor may be configured to construct the data section by sectioning the spatial data that includes road network data, background data, and search data. The update provider may be configured to generate delta data by comparing old version map data and new version map data for each mesh, and to transmit the delta data to the navigation device.

The update provider may be configured to extract a mesh of which data is modified by comparing old version map data and new version map data for each mesh, to generate delta data associated with the extracted modified mesh, and to transmit the delta data to the navigation device.

According to another example embodiment, there is provided a server to provide map data of a navigation device, the server including a data constructor configured to construct a data section by sectioning spatial data included in each of meshes, and to classify the data section based on a data block with a preset size; a delta data generator configured to generate delta data by comparing old version map data and new version map data for each mesh, and by extracting modified spatial data from the meshes; a delta header generator configured to generate a delta header that is reference information of the delta data based on at least one of the modified spatial data, the meshes, and the data block; a delta file generator configured to generate a delta file that includes the delta data and the delta header; a delta file header generator configured to generate a delta file header that is reference information of the delta file; and a transmitter configured to transmit the delta file and the delta file header to the navigation device.

The spatial data may include road network data, background data, and search data.

The delta file generator may be configured to generate the delta file by including the delta data, the delta header, and an error detection code for error detection.

According to an aspect, the server to provide map data of the navigation device may further include a receiver configured to receive old version history information associated with the old version map data from the navigation device; and a version history manager configured to generate new version history information by analyzing the old version history information and a version history table that includes version history information of the navigation device.

The delta data generator may be configured to generate the delta data by comparing the new version history information and the new version map data for each mesh and by extracting the modified spatial data from the meshes, and the delta file header generator may be configured to generate the delta file header that includes the new version history information.

According to an example embodiment, there is provided a navigation device embedded in a vehicle and to update map data, the navigation device including a receiver configured to receive a delta file and a delta file header from a server; a first extractor configured to extract a compressed data block included in an update item from old version map data by referring to the delta file header; a second extractor configured to decompress the compressed data block, and to extract a block header and an old version mesh included in the decompressed data block; an updater configured to update old version spatial data corresponding to the delta data in the old version mesh by referring to the delta file header, and to update the block header based on the delta header; and a re-compressor configured to recompress the decompressed data block based on the updated old version mesh and the updated block header.

The second extractor may be configured to extract the delta header, the delta data, and an error detection code for error detection that are included in the delta file.

According to an aspect, the navigation device may further include an error detector configured to detect an error associated with the delta header and the delta data using the extracted error detection code.

The receiver may be configured to receive, from the server, the delta file header that includes the delta file and new version history information.

According to another aspect, the navigation device may further include a transmitter configured to transmit old version history information associated with the old version map data to the server; and a version history manager configured to manage the old version history information and the new version history information.

The old version mesh may be constructed as a data section by sectioning old version spatial data that includes road network data, background data, and search data.

According to an example embodiment, there is provided a method of providing, at a server, map data of a navigation device, the method including dividing entire map data into irregular meshes based on density of spatial data that constitutes a map; constructing a data section by sectioning spatial data included in each of the meshes; classifying the data section based on a data block with a preset size, and generating a table that includes metadata for each data block; and providing update of map data that is compressed and stored in the navigation device based on delta data. The data block is the same data as the data block that is compressed and stored in the navigation device.

The providing of the update may include extracting a mesh of which data is modified by comparing old version map data and new version map data for each mesh, generating delta data associated with the extracted modified mesh, and transmitting the delta data to the navigation device.

According to another example embodiment, there is provided a method of providing, at a server, map data of a navigation device, the method including constructing a data section by sectioning spatial data included in each of meshes, and classifying the data section based on a data block with a preset size; generating delta data by comparing old version map data and new version map data for each mesh, and by extracting modified spatial data from the meshes; generating a delta header that is reference information of the delta data based on at least one of the modified spatial data, the meshes, and the data block; generating a delta file that includes the delta data and the delta header; generating a delta file header that is reference information of the delta file; and transmitting the delta file and the delta file header to the navigation device.

The generating of the delta file may include generating the delta file by including the delta data, the delta header, and an error detection code for error detection.

According to an aspect, the map data providing method may further include receiving old version history information associated with the old version map data from the navigation device; and generating new version history information by analyzing the old version history information and a version history table that includes version history information of the navigation device.

The generating of the delta data may include generating the delta data by comparing the new version history information and the new version map data for each mesh and by extracting the modified spatial data from the meshes, and the generating of the delta file header may include generating the delta file header that includes the new version history information.

According to an example embodiment, there is provided a map data update method performed at a navigation device, the method including receiving a delta file and a delta file header from a server; extracting a compressed data block included in an update item from old version map data by referring to the delta file header; decompressing the compressed data block, and extracting a block header and an old version mesh included in the decompressed data block; updating old version spatial data corresponding to the delta data in the old version mesh by referring to the delta file header, and updating the block header based on the delta header; and recompressing the decompressed data block based on the updated old version mesh and the updated block header.

The extracting of the block header and the old version mesh may include extracting the delta header, the delta data, and an error detection code for error detection that are included in the delta file.

The receiving of the compressed delta file and the delta file header may include receiving, from the server, the delta file header that includes the delta file and new version history information.

According to an aspect, the map data update method may further include transmitting old version history information associated with the old version map data to the server; and managing the old version history information and the new version history information.

Effects

According to example embodiments, similar to updating other original parts embedded in a vehicle, update of a navigation device that is an original part embedded in the vehicle may be performed under a significantly limited condition.

Also, since the navigation device is embedded in the vehicle, a user may readily update the navigation device and a vehicle owner may save an amount of time used for update.

Also, the navigation device may update map data without using an additional memory.

BRIEF DESCRIPTION OF DRAWINGS

FIG. 5 illustrates an example of generating a table that includes metadata for each data block according to an example embodiment;

FIG. 8 illustrates an example of constructing a version history table according to an example embodiment;

BEST MODE

Hereinafter, example embodiments will be described with reference to the accompanying drawings, however, are not limited thereto or restricted thereby.

Meanwhile, when it is determined that detailed description related to a related known function or configuration they may make the purpose of the example embodiments unnecessarily ambiguous in describing the example embodiments, the detailed description will be omitted here. Also, terminologies used herein are defined to appropriately describe the example embodiments and thus may be changed depending on a user, the intent of an operator, or a custom. Accordingly, the terminologies must be defined based on the following overall description of this specification.

Figure 1:
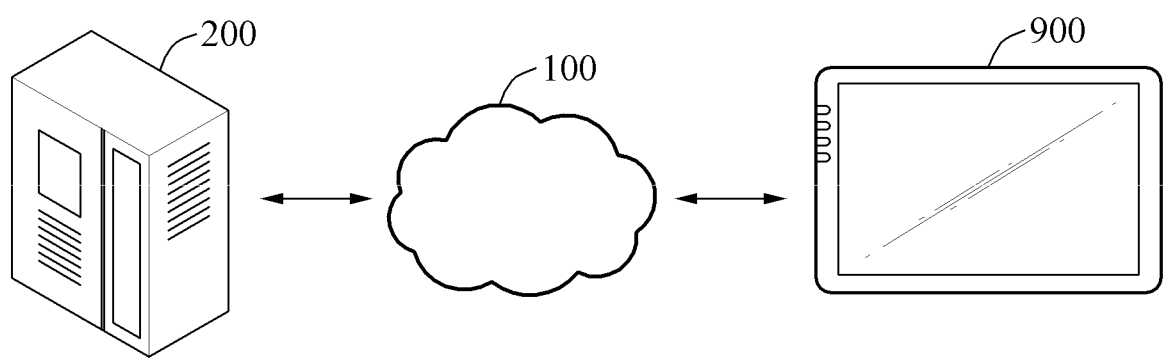
FIG. 1 is a diagram illustrating a map data providing system of a navigation device according to an example embodiment.

FIG. 1 is a diagram illustrating a map data providing system of a navigation device according to an example embodiment.

Referring to FIG. 1, the map data providing system includes a server 200 configured to provide map data over a wired/wireless communication network 100 and a navigation device 900 embedded in a vehicle and configured to update the map data.

Here, the wired/wireless communication network 100 may include a local area communication network. For example, the navigation device 900 may be installed as an embedment type at the production of the vehicle. Accordingly, update of map data embedded in the navigation device 900 may be performed through a local network of a designated auto mechanic.

The map data providing system may include the server 200 configured to generate delta data by comparing old version map data and new version map data for each spatially divided mesh and the navigation device 900 embedded in the vehicle and configured to update map data that is compressed and stored based on the delta data.

The server 200 may generate delta data by comparing old version map data and new version map data for each mesh and by extracting only modified spatial data from meshes, and may update the map data that is compressed and stored in the navigation device 900 based on the delta data.

Here, the spatial data may include a variety of graphics data, road network data, background data, and search data that constitute the map data.

Here, the server 200 may construct a data section by sectioning spatial data included in each of the meshes, and may classify the data section based on a data block with a preset size. In detail, the server 200 may classify the data section based on a data block based on at least one of density of spatial data included in each of the meshes and a size between adjacent meshes.

Here, the density of spatial data may indicate at least one of a size of data included in a single mesh or grid, an attribute or properties of data, and a distribution ratio of a predetermined attribute among data attributes.

For example, if a space included in a single mesh is an urban city in which buildings are densely distributed, the density of spatial data may be represented to be high, and otherwise, the density of spatial data may be represented to be low.

The data block may be the same data as the data block that is compressed and stored in the navigation device 900.

Depending on example embodiments, the server 200 may generate a delta header that is reference information of delta data based on at least one of spatial data, meshes, and a data block, may generate a delta file that includes the delta data and the delta header, and may generate a delta file header that is reference information of the delta file. Also, the server 200 may compress the delta file, and may transmit the compressed delta file and the delta file header to the navigation device 900.

The navigation device 900 may update the compressed and stored map data based on the delta data. The navigation device 900 may receive the delta file and the delta file header from the server 200, may decompress the compressed file header included in old version map data, and may extract only the compressed data block included in an update item from the old version map data by referring to the decompressed file header and delta file header.

Also, the navigation device 900 may extract the delta header and the delta data included in the delta file, may decompress the compressed data block, and may extract a block header and an old version mesh that are included in the decompressed data block.

Also, the navigation device 900 may update only old version spatial data corresponding to delta data in the old version mesh by referring to the delta header and the block header.

Hereinafter, an operation of a map data providing method and system of a navigation device will be described.

Figure 2:
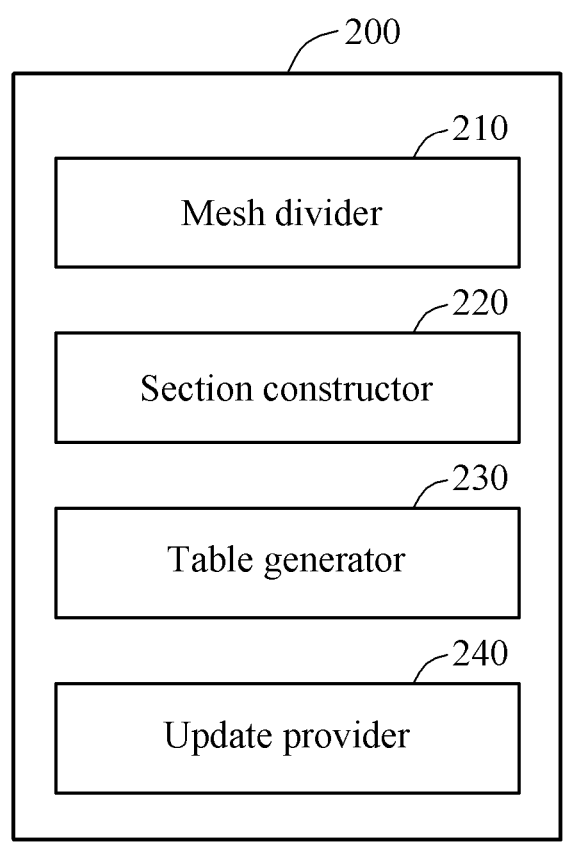
FIG. 2 is a block diagram illustrating a server to provide map data of a navigation device according to an example embodiment.

FIG. 2 is a block diagram illustrating a server to provide map data of a navigation device according to an example embodiment.

Referring to FIG. 2, a server 200 configured to provide map data of a navigation device includes a mesh divider 210, a section constructor 220, a table generator 230, and an update provider 240.

The mesh divider 210 divides the entire map data into spatial meshes based on density of spatial data that constitutes a map. The mesh divider 210 may divide the entire map data into meshes having irregular spatial sizes based on the density of spatial data that constitutes the map.

The section constructor 220 constructs a data section by sectioning spatial data included in each of the meshes. In detail, the section constructor 220 may construct the data section by sectioning the spatial data that includes road network data, background data, and search data.

Meanwhile, map data is stored in the navigation device 900 in a compressed state. However, it may be nearly impossible to generate a delta file using a compressed new version map file and a compressed old version map filed stored in a client terminal. The new version map file and the old version map file are classified for each block and compressed. If the two files are compared in the above state, a difference may be recognized to be present over the entire file area.

Accordingly, the server 200 may construct a data file using original map data before compression, and may provide information associated with a modified portion through a header. Since data may be provided in this manner, the navigation device may have no need to decompress the entire data.

Hereinafter, the mesh divider 210 and the section constructor 220 will be further described with reference to FIG. 3.

Figure 3:
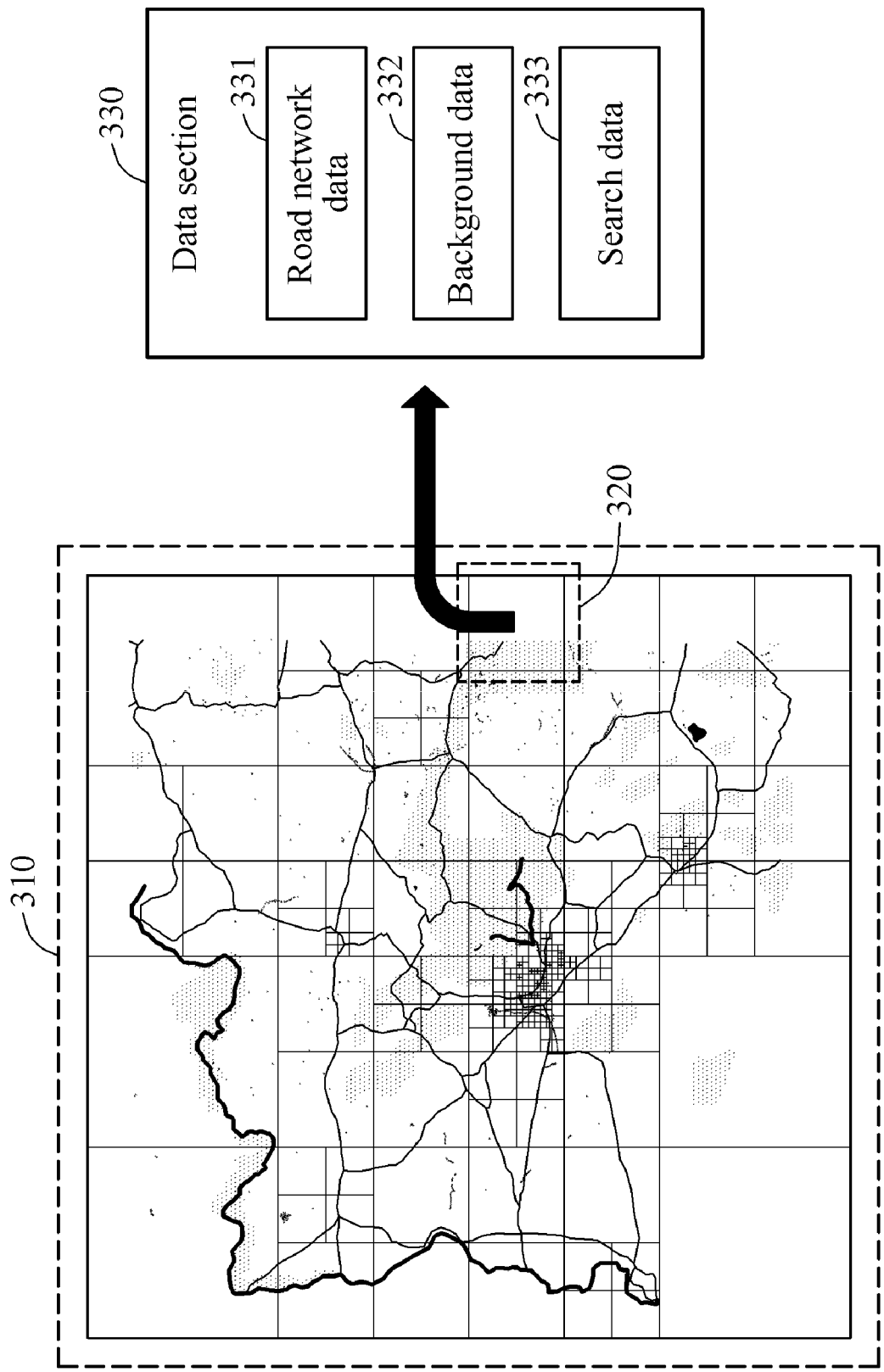
FIG. 3 illustrates an example of a map in which the entire map data is spatially and dynamically divided into meshes and a data section constructed by sectioning spatial data included in each of the meshes according to an example embodiment.

FIG. 3 illustrates an example of a map in which the entire map data is spatially and dynamically divided into meshes and a data section constructed by sectioning spatial data included in each of the meshes according to an example embodiment.

Referring to FIG. 3, the mesh divider 210 may divide the entire map data into meshes 320 having irregular spatial sizes based on density of spatial data that constitutes a map 310. In detail, the mesh divider 210 may divide the map data so that a mesh division size may decrease on the map 310 according to an increase in the density of spatial data, and may divide the map data so that a mesh division size may increase on the map 310 according to a decrease in the density of spatial data. In this manner, the mesh divider 210 may divide the map data into spatially divided meshes.

For example, in the case of relatively large spatial data associated with an urban area in which one or more roads, buildings, and other geographical features are densely present, the mesh divider 210 may divide map data into meshes having relatively small division sizes on the map 310, which are spatially divided meshes for performing efficient capacity management with respect to the entire map data and also efficiently managing the spatial data for each mesh.

Also, in the case of relatively small spatial data associated with a nonurban area in which the sea or the mountains are densely present, the mesh divider 210 may divide map data into meshes having relatively large division sizes on the map 310, which are spatially divided meshes for performing efficient capacity management with respect to the entire map data and also efficiently managing the spatial data for each mesh.

The section constructor 220 may construct a data section 330 by sectioning the spatial data that includes road network data 331, background data 332, and search data 333.

The road network data 331 may be data associated with roads that include expressways, general national highways, capital cities and provinces, metropolitan cities and provinces, provinces, cities and provinces, islands, districts, tunnels, bridges, ferries, etc.

The background data 332 may be data associated with one of buildings, facilities, mountains, sea, and other geographical features.

The search data 333 may be data associated with one of address information, unique name information, search name information, identification number information, and identification coordinates information of the road network data 331 and the background data 332 on the map 310.

The data section 330 may be constructed by sectioning the spatial data that includes at least one of the road network data 331, the background data 332, and the search data 333.

Referring again to FIG. 2, the table generator 230 may classify a data section based on a data block with a preset size, and may generate a table that includes metadata for each data block. Hereinafter, the table generator 230 will be further described with reference to FIGS. 4 and 5.

Figure 4:
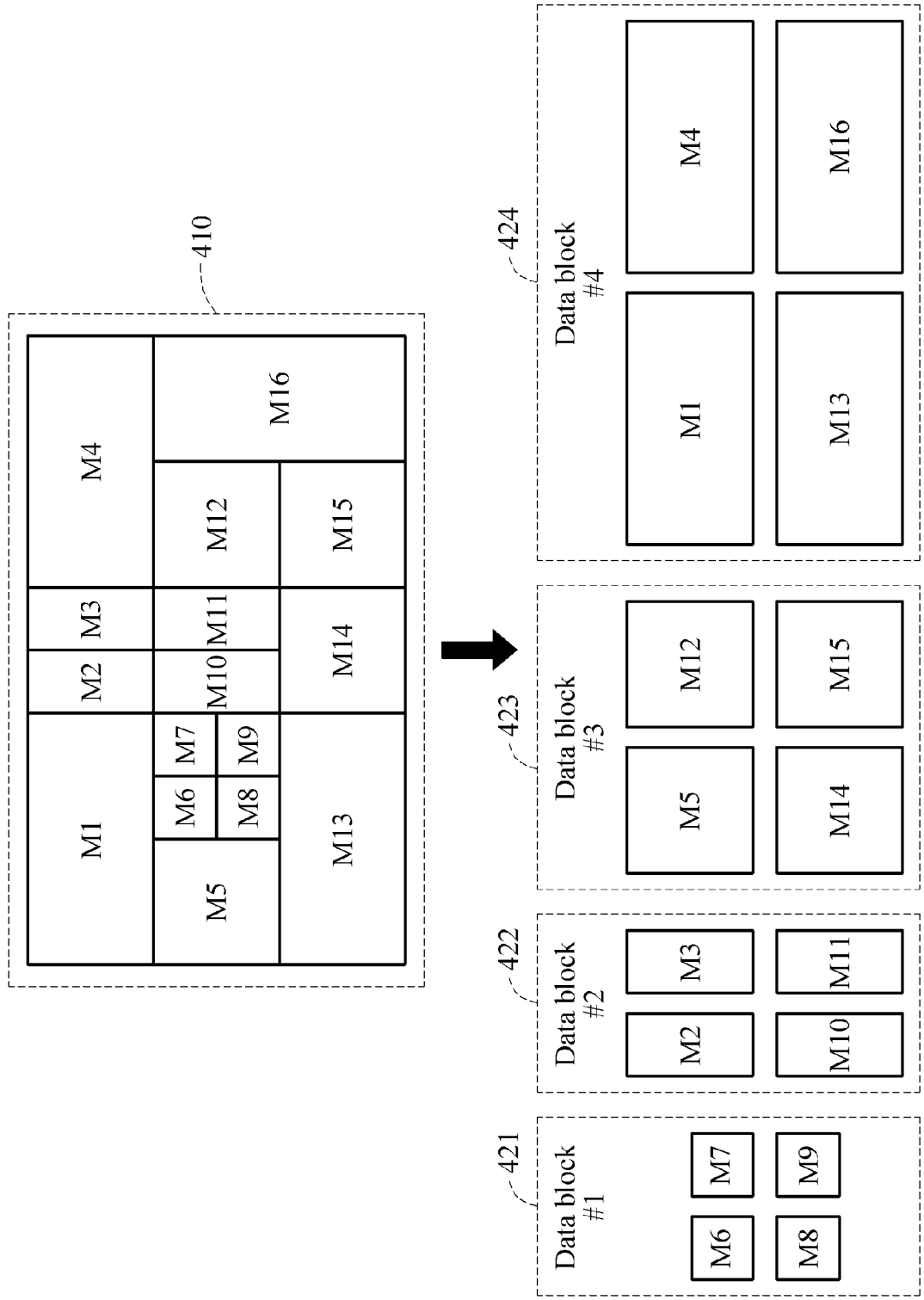
FIG. 4 illustrates an example of a data block classified based on a size of spatial data included in each of meshes according to an example embodiment.

FIG. 4 illustrates an example of a data block classified based on a size of spatial data included in each of meshes according to an example embodiment.

Referring to FIG. 4, the table generator 230 may classify a data section based on a data block with a preset size. In detail, the table generator 230 may classify the data section based on a data block based on at least one of a capacity of spatial data included in each of meshes and a size between adjacent meshes.

Referring to FIG. 4, the table generator 230 may classify the data section into a data block NO. 1 421 that includes meshes M6, M7, M8 and M9, a data block NO. 2 422 that includes meshes M2, M3, M10 and M11, a data block NO. 3 423 that includes meshes M5, M12, M14 and M15, and a data block NO. 4 424 that includes meshes M1, M4, M13 and M16 based on the capacity of spatial data.

For example, in the case of relatively large spatial data such as an urban area, the table generator 230 may classify, into a data block, meshes divided to have relatively small division sizes on a map 410. In the case of relatively small spatial data such as a nonurban area, the table generator 410 may classify, into a data block, meshes divided to have relatively large division sizes on the map 410.

Also, the table generator 230 may classify a data section into a data block based on sequential order of the large spatial data, for example, an urban area in which various modifications, such as building or changing roads, etc., are present. In detail, if the table generator 230 classifies meshes into a data block based on sequential order of attribute data having relatively large capacity, an urban area in which map data is frequently updated may be initially searched and be used to effectively reduce a search time.

Also, the table generator 230 may classify a data section based on a data block by sectioning spatial data included in each of the meshes. In detail, the table generator 230 may classify a data section based on a data block by sectioning each of or all of road network data, background data, and search data that are spatial data included in each of the meshes.

For example, the table generator 230 may classify a data section based on a data block by sectioning at least one of road network data included in the meshes M6, M7, M8 and M9, background data included in the meshes M6, M7, M8 and M9, and search data included in the meshes M6, M7, M8 and M9.

Also, the table generator 230 may classify a data section based on a data block by sectioning all of road network data, background data, and search data included in the meshes M6, M7, M8 and M9.

Also, the table generator 230 may classify a data section into data blocks based on a size between adjacent meshes. For example, the table generator 230 may classify a data section into a data block NO. 1 that includes the meshes M1 and M2, a data block NO. 2 that includes the meshes M3 and M4, and a data block NO. 3 that includes the meshes M5, M6, M7, M8 and M9, based on a size between adjacent meshes.

According to an aspect, a single mesh may include a plurality of pieces of road network data, a plurality of pieces of background data, and a plurality of pieces of search data.

FIG. 5 illustrates an example of generating a table that includes metadata for each data block according to an example embodiment.

Referring to FIG. 5, the table generator 230 generates a table that includes metadata for each data block.

The metadata may include reference information for each data block within map data, a mesh included in a data block, and reference information associated with spatial data. In detail, the metadata may be reference information that includes at least one of location address information, unique name information, and identification number information associated with actual data, for example, a data block, a mesh, spatial data, etc., within the map data.

According to an aspect, metadata may be used to manage map data, such as search for map data, details of update, providing of update, and the like.

Referring again to FIG. 2, the update provider 240 may update map data that is compressed and stored in the navigation device, based on delta data. In detail, the update provider 240 may generate delta data by comparing old version map data and new version map data for each mesh, and may transmit the delta data to the navigation device. Hereinafter, an example of generating delta data will be described with reference to FIG. 6.

Figure 6:
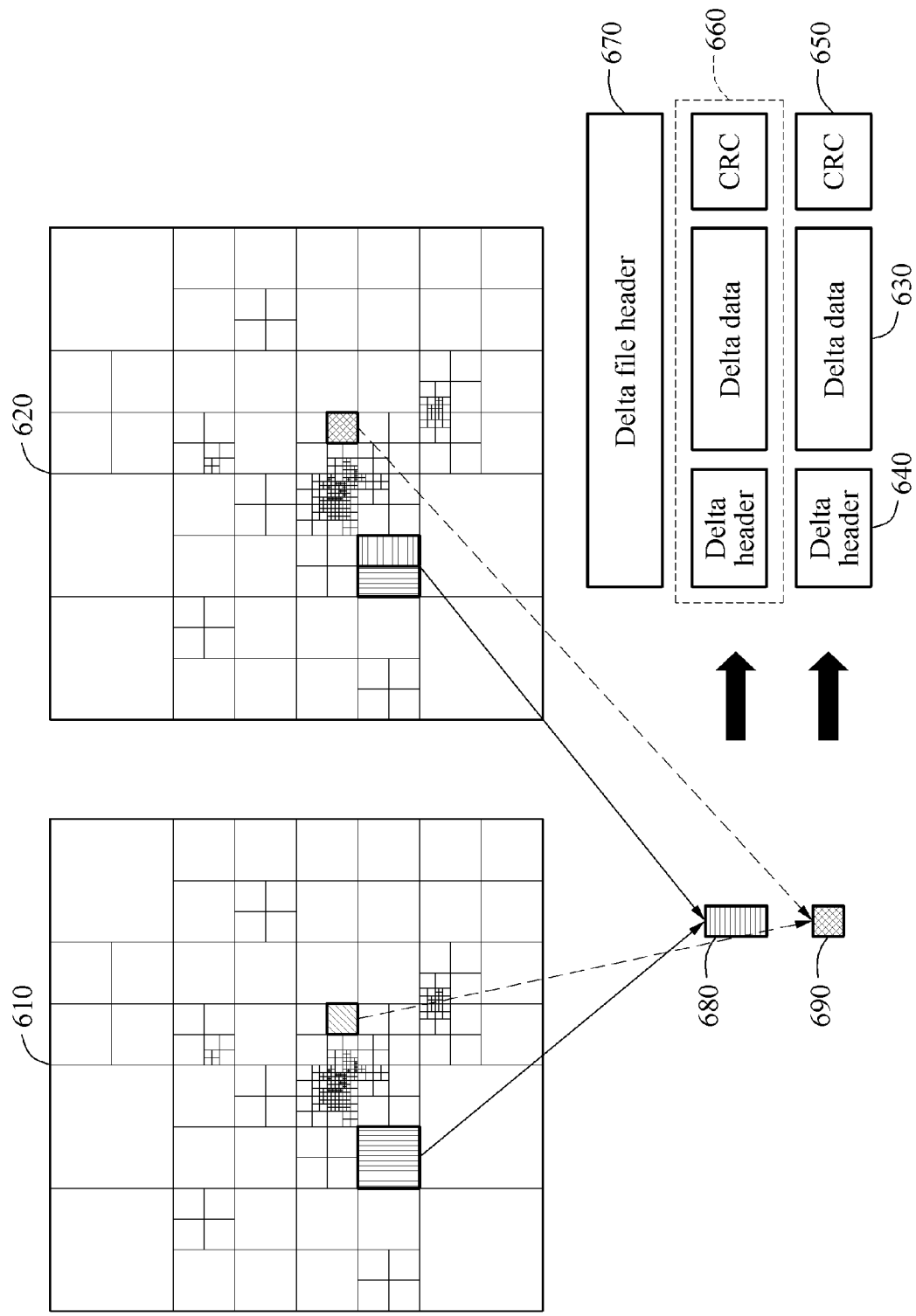
FIG. 6 illustrates an example of generating delta data by comparing old version map data and new version map data for each mesh according to an example embodiment.

FIG. 6 illustrates an example of generating delta data by comparing old version map data and new version map data for each mesh according to an example embodiment.

Here, an update provider of a server may generate delta data by comparing old version map data and new version map data for each mesh, by extracting a mesh of which data is modified, and by comparing a new version and an old version only with respect to the modified mesh.

Here, the modified mesh may be extracted by comparing spatial data for each mesh or may be extracted in response to a direct input of information associated with the modified mesh.

In addition, the update provider 240 may generate delta data by comparing old version map data 610 and new version map data 620 for each mesh and by extracting only modified spatial data from meshes, and may transmit delta data 630 to a navigation device.

Here, the delta data 630 may be compressed and then be transmitted to the navigation device.

The delta data 630 may be modified spatial data associated with at least one of road network data, background data, and search data among meshes, and may be modified spatial data associated with at least one of a plurality of pieces of road network data, a plurality of pieces of background data, and a plurality of pieces of search data among meshes.

The delta data 630 may be data that is generated according to a delta file generation algorithm based on binary data.

For example, a single mesh may have a capacity of a few to tens of K bytes, and a generated delta file may have a capacity less than 5 K bytes. Accordingly, when transmitting delta data, it is possible to significantly reduce the capacity of transmission data compared to transmitting the entire modified mesh data to the navigation device.

Depending on example embodiments, the update provider 240 may generate a delta header 640 that is reference information of the delta data 630 based on at least one of the modified spatial data, meshes, and a data block, and may transmit, to the navigation device, a delta file 660 that includes the delta data 630 and the delta header 640.

The delta header 640 may be reference information that includes at least one of location address information, unique name information, and identification number information associated with at least one of the modified spatial data, the meshes, and the data block in map data.

Also, the delta file 660 may include the delta data 630, the delta header 640, and an error detection code 650 for error detection. The error detection code 650 may be a cyclical redundancy check (CRC) code.

Depending on example embodiments, the update provider 240 may generate a delta file header 670 that is reference information of the delta file 660, may compare all of or each of the delta files 660, and may transmit the compressed delta file and delta file header 670 to the navigation device.

The delta file header 670 may include reference information that includes at least one of location address information, unique name information, and identification number information associated with the data block and frame rate information that indicates transmission capacity information of the delta file 660.

The data block may be the same data as the data block that is compressed and stored in the navigation device.

According to an aspect, the server 200 configured to provide map data of a navigation device may receive old version history information associated with old version map data from the navigation device, and may generate new version history information by analyzing the old version history information and a version history table that includes version history information of the navigation device.

The old version history information may be history information associated with a data block, meshes, and spatial data of an old version recently updated at the navigation device.

The version history information may be history information associated with a data block, meshes, and spatial data of an old version recently or previously updated at the navigation device and history information associated with a data block, meshes, and spatial data of a new version recently updated at the server 200.

Depending on example embodiments, the update provider 240 may generate the delta data 630 by comparing new version history information and new version map data for each mesh, and by extracting only modified spatial data from the meshes.

Also, the update provider 240 may generate the delta file header 670 that includes new version history information.

Figure 7:
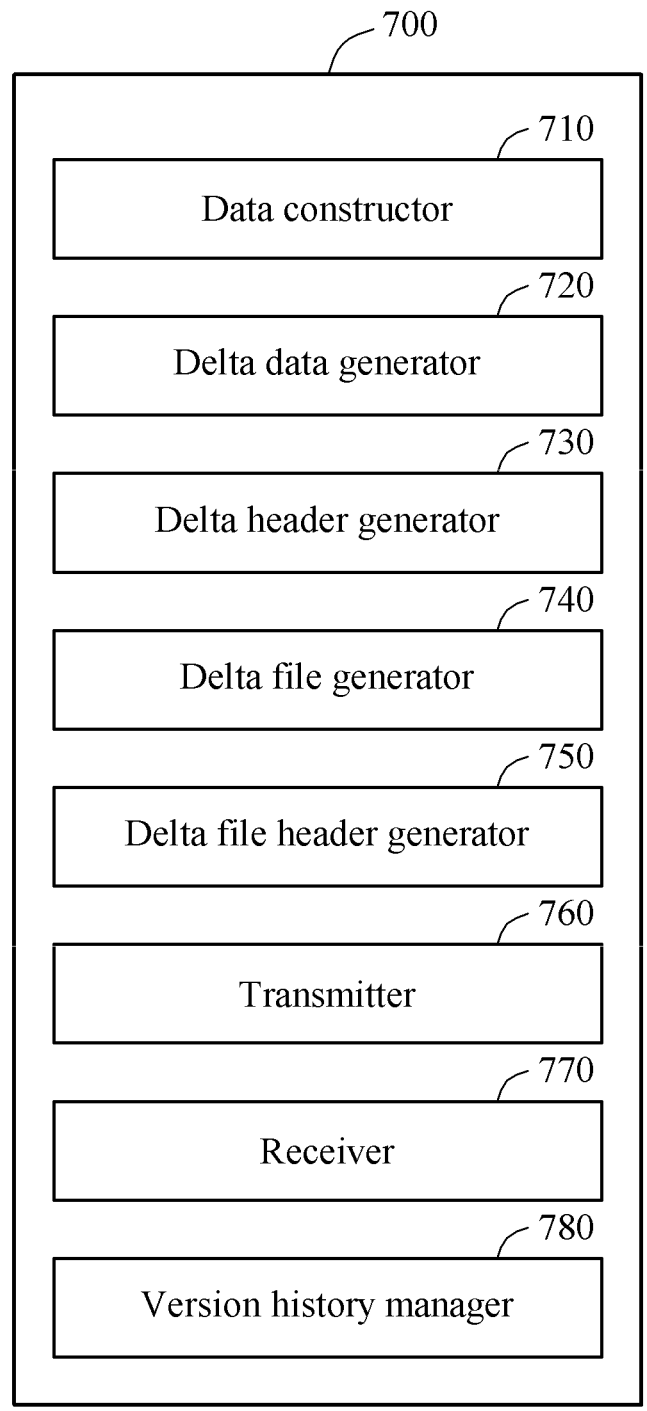
FIG. 7 is a block diagram illustrating a server to provide map data of a navigation device according to another example embodiment.

FIG. 7 is a block diagram illustrating a server to provide map data of a navigation device according to another example embodiment.

Referring to FIG. 7, a server 700 configured to provide map data of a navigation device includes a data constructor 710, a delta data generator 720, a delta header generator 730, a delta file generator 740, a delta file header generator 750, and a transmitter 760.

The data constructor 710 constructs a data section by sectioning spatial data included in each of meshes and classifies the data section based on a data block with a preset size.

In detail, the, the data constructor 710 may construct a data section by sectioning spatial data included in each of meshes that are dynamically divided based on irregular meshing, and may classify the data section into data blocks based on at least one of capacity of spatial data included in each of the meshes and a sizes between adjacent meshes.

The data section may be constructed by sectioning spatial data that includes at least one of road network data, background data, and search data.

Depending on example embodiment, in the case of relatively large spatial data such as an urban area, the data constructor 710 may classify, into a data block, meshes divided to have relatively small division sizes on a map. In the case of relatively small spatial data such as a nonurban area, the data constructor 710 may classify, into a data block, meshes divided to have relatively large division sizes on the map.

Also, the data constructor 710 may classify a data section into a data block based on sequential order of large spatial data, for example, an urban area in which various modifications, such as building or changing roads. etc., are present.

Also, the data constructor 710 may classify a data section based on a data block by sectioning spatial data included in each of the meshes. In detail, the data constructor 710 may classify a data section based on a data block by sectioning each of or all of road network data, background data, and search data that are spatial data included in each of the meshes.

Also, the data constructor 710 may classify a data section based on a data block based on a size between adjacent meshes.

Also, the data constructor 710 may generate a table that includes metadata for each data block.

The metadata may include reference information for each data block within map data, a mesh included in a data block, and reference information associated with spatial data. In detail, the metadata may be reference information that includes at least one of location address information, unique name information, and identification number information associated with actual data, for example, a data block, a mesh, spatial data, etc., within the map data.

According to an aspect, a single mesh may include a plurality of pieces of road network data, a plurality of pieces of background data, and a plurality of pieces of search data.

The delta data generator 720 may generate delta data by comparing old version map data and new version map data for each mesh and by extracting only modified spatial data from meshes.

The delta data may be modified spatial data associated with at least one of road network data, background data, and search data among the meshes, and may be modified spatial data associated with at least one of a plurality of pieces of road network data, a plurality of pieces of background data, and a plurality of pieces of search data among the meshes.

The delta header generator 730 generates a delta header that is reference information of delta data based on at least one of modified spatial data, meshes, and a data block.

The delta header may be reference information that includes at least one of location address information, unique name information, and identification number information associated with at least one of modified spatial data, meshes, and a data block in map data.

The delta file generator 740 generates a delta file that includes delta data and a delta header. In detail, the delta file generator 740 may generate the data file by including the delta data, the delta header, and an error detection code for error detection. The error detection code may be a CRC code.

The delta file header generator 750 generates a delta file header that is reference information of the delta file.

The delta file header may include reference information that includes at least one of location address information, unique name information, and identification number information associated with the data block, and frame rate information that indicates transmission capacity information of the delta file.

The transmitter 760 transmits the delta file and the delta file header to the navigation device.

According to an aspect, the transmitter 760 may compress and sequentially transmit each of at least one delta file, may compress and collectively transmit each of at least one delta file, and may compress and transmit all of at least one delta file.

The server 700 configured to provide map data of the navigation device may include a receiver 770 configured to receive old version history information associated with old version map data from the navigation device and a version history manager 780 configured to generate new version history information by analyzing the old version history information and a version history table that includes version history information of the navigation device.

Hereinafter, an example of the version history manager 780 that constructs a version history table will be described with reference to FIG. 8.

FIG. 8 illustrates an example of constructing a version history table according to an example embodiment.

Referring to FIG. 8, the version history manager 780 may generate new version history information 830 by analyzing old version history information and a version history table that includes version history information of a navigation device.

The old version history information may be history information associated with a data block, meshes, and spatial data of an old version 810 recently updated at the navigation device.

The version history information may be history information associated with a data block, meshes, and spatial data of an old version recently or previously updated at the navigation device, and history information associated with a data block, meshes, and spatial data of a new version 820 recently updated at the server 200.

Depending on example embodiments, the delta data generator 720 may generate delta data by comparing the new version history information 830 and new version map data for each mesh and by extracting only modified spatial data from the meshes.

Also, the delta file header generator 750 may generate a delta file header that includes the new version history information 830.

Figure 9:
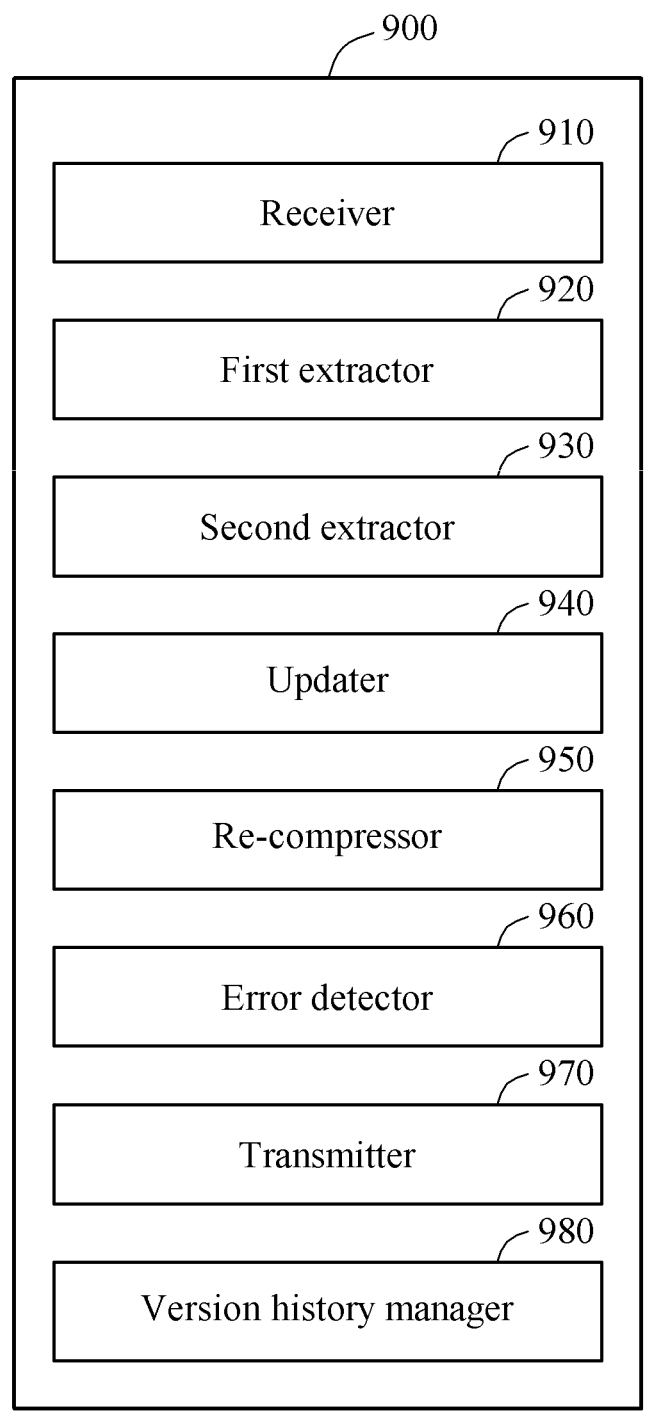
FIG. 9 is a block diagram illustrating a navigation device embedded in a vehicle and to update map data according to an example embodiment.

FIG. 9 is a block diagram illustrating a navigation device embedded in a vehicle and to update map data according to an example embodiment.

Referring to FIG. 9, a navigation device 900 embedded in a vehicle and to update map data includes a receiver 910, a first extractor 920, a second extractor 930, an updater 940, and a re-compressor 950.

The receiver 910 receives a delta file and a delta file header from a server.

The delta file may be a file acquired by compressing all of or each of delta files, and the delta file header may include reference information that includes at least one of location address information, unique name information, and identification number information associated with a data block and frame rate information that indicates transmission capacity information of the delta file.

The first extractor 920 decompresses a compressed file header included in old version map data and extracts only a compressed data block included in an update item from the old version map data by referring to the decompressed file header and delta file header.

Hereinafter, a format of old version map data of the navigation device will be described with reference to FIG. 10.

Figure 10:
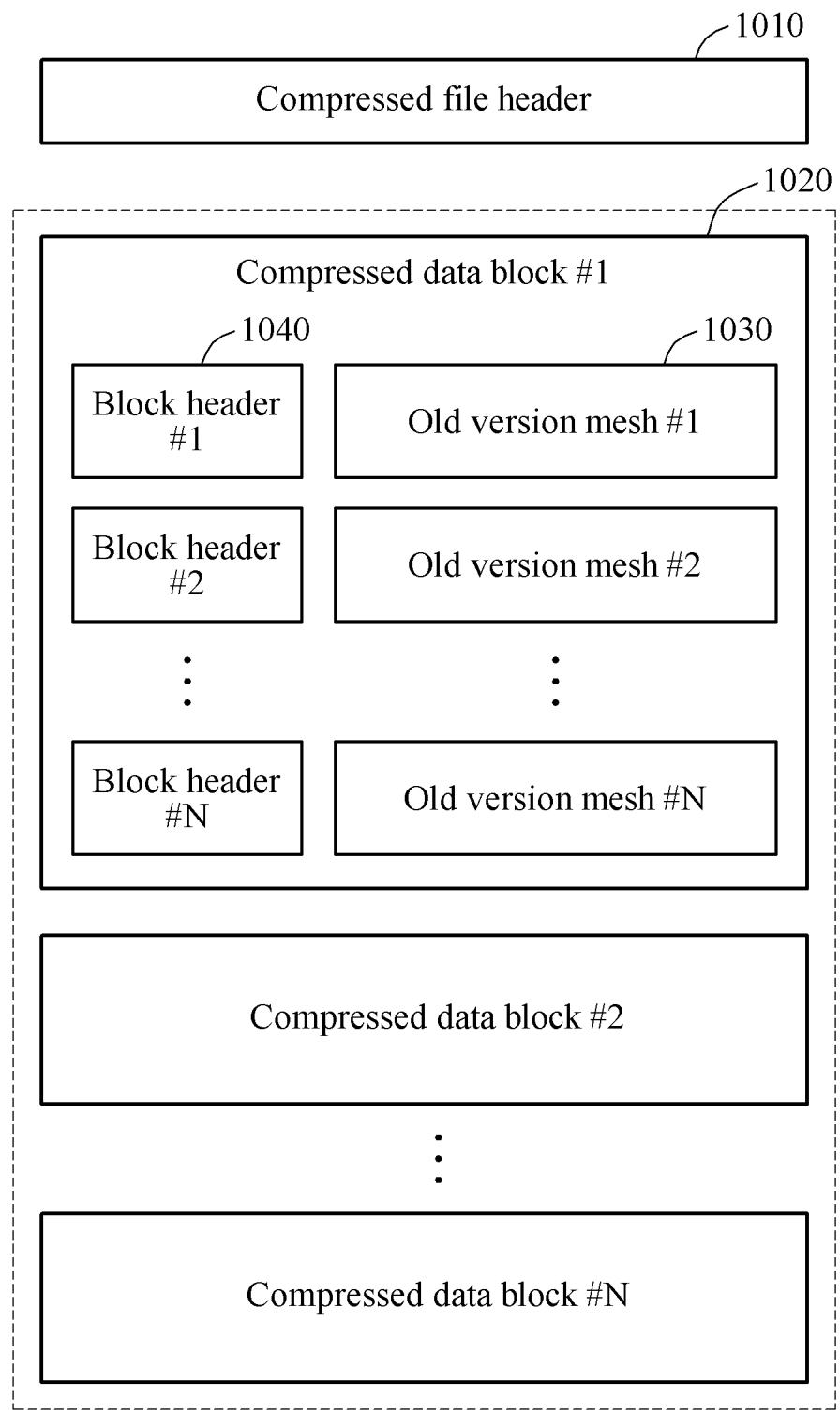
FIG. 10 illustrates an example of a format of old version map data of a navigation device according to an example embodiment.

FIG. 10 illustrates an example of a format of old version map data of a navigation device according to an example embodiment.

Referring to FIG. 10, a format of old version map data may include a compressed file header 1010 and a compressed data block that includes at least one old version mesh and block header.

The first extractor 920 decompresses the compressed file header 1010 that is included in the old version map data, and extracts only a compressed data block included in an update item from the old version map data by referring to the decompressed file header and delta file header.

In detail, the first extractor 920 may extract only a compressed data block 1020 corresponding to reference information of the decompressed file header 1010 and reference information of the delta file header.

The decompressed file header may be reference information that includes at least one of location address information, unique name information, and identification number information associated with the compressed data block.

The second extractor 930 extracts a delta header and delta data included in a delta file, decompresses the compressed data block 1020, and extracts a block header 1040 and an old version mesh 1030 included in the decompressed data block.

The delta data may be updated spatial data associated with at least one of road network data, background data, and search data among meshes, and may be updated spatial data associated with at least one of a plurality of pieces of road network data, a plurality of pieces of background data, and a plurality of pieces of search data among the meshes.

The delta header may be reference information that includes at least one of location address information, unique name information, and identification number information associated with at least one of updated spatial data, meshes, and a data block in map data.

The old version mesh 1030 may be spatial data of an old version associated with at least one of road network data, background data, and search data, and may be spatial data of an old version associated with at least one of a plurality of pieces of road network data, a plurality of pieces of background data, and a plurality of pieces of search data.

Also, the old version mesh 1030 may be constructed as a data section by sectioning spatial data of an old version that includes road network data, background data, and search data.

The block header 1040 may be reference information that includes at least one of location address information, unique name information, and identification number information associated with at least one of spatial data of an old version and meshes of the old version in map data.

Depending on example embodiments, the second extractor 930 may extract the delta header, delta data, and an error detection code for error detection that are included in the delta file.

The navigation device 900 embedded in the vehicle and to update map data may further include an error detector 960 configured to detect an error for delta data and a delta header using the extracted error detection code.

The updater 940 updates only spatial data of an old version corresponding to delta data from the old version mesh 1030 by referring to the delta header and the block header 1040, and updates the block header 1040 based on the delta header.

In detail, the updater 940 may update only spatial data of an old version associated with at least one of road network data, background data, and search data among meshes corresponding to reference information of the delta header and reference information of the block header 1040, and may update only spatial data of the old version associated with at least one of a plurality of pieces of road network data, a plurality of pieces of background data, and a plurality of pieces of search data among meshes.

Also, the updater 940 may update the reference information of the block header 1040 with reference information of the delta header.

The re-compressor 950 recompresses the decompressed data block based on the updated old version mesh and the updated block header.

The navigation device 900 embedded in the vehicle and to update map data may further include a transmitter 970 configured to transmit old version history information associated with old version map data to the server.

The old version history information may be history information associated with the compressed data block 1020 of the old version recently updated at the navigation device, the old version mesh 1030, and spatial data of the old version.

According to an aspect, the receiver 910 may receive, from the server, a delta file header that includes a compressed delta file and new version history information.

The new version history information may be history information that is generated by analyzing old version history information and a version history table that includes version history information.

The version history information may be history information associated with a data block of an old version recently or previously updated at the navigation device 900, meshes of the old version, and spatial data of the old version, and history information associated with a data block of a new version recently updated at the server, meshes of the new version, and spatial data of the new version.

The navigation device 900 embedded in the vehicle and to update map data may further include a version history manager 980 configured to manage old version history information and new version history information.

As described above, since the navigation device 900 patches delta data by decompressing only the updated data block, update may be quickly performed. A large storage device may not be required.

Figure 11:
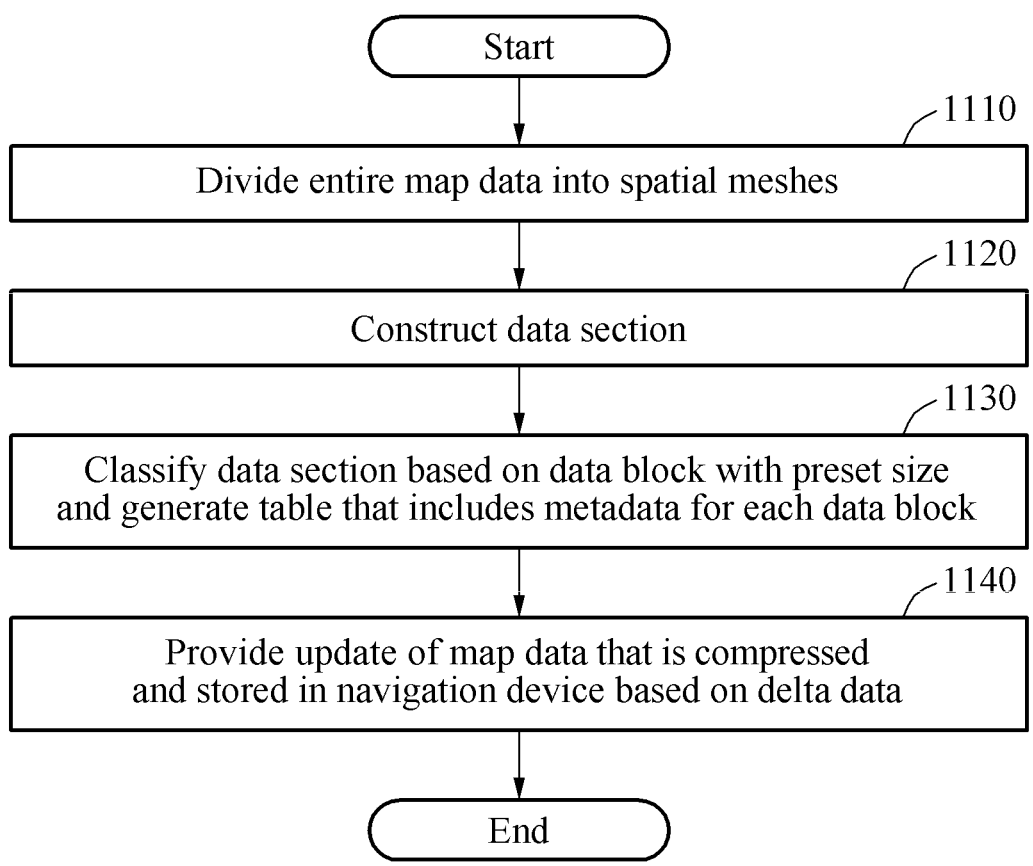
FIG. 11 is a flowchart illustrating a method of providing, at a server, map data of a navigation device according to an example embodiment.

FIG. 11 is a flowchart illustrating a method of providing, at a server, map data of a navigation device according to an example embodiment.

Referring to FIG. 11, a method of providing, at the server, map data of the navigation device (hereinafter, map data providing method) divides the entire map data into spatially and dynamically divided meshes based on density of spatial data that constitutes a map in operation 1110.

That is, in operation 1110, the map data providing method may divide the entire map data into meshes based on the density of spatial data that constitutes the map.

In operation 1120, the map data providing method constructs a data section by sectioning spatial data included in each of the meshes.

In detail, in operation 1120, the map data providing method may construct the data section by sectioning spatial data that includes road network data, background data, and search data.

The data section may be constructed by sectioning spatial data that includes at least one of road network data, background data, and search data.

In operation 1130, the map data providing method classifies the data section based on a data block with a preset size and generates a table that includes metadata for each data block.

In detail, in operation 1130, the map data providing method may classify the data section based on a data block based on at least one of capacity of the spatial data included in each of the meshes and a size between adjacent meshes.

The data block is the same data as the data block that is compressed and stored in the navigation device.

The metadata may include reference information for each data block within map data, a mesh included in a data block, and reference information associated with spatial data, and may be used to manage map data, such as search for map data, details of update, providing update, and the like.

In operation 1140, the map data providing method provides update of the map data that is compressed and stored in the navigation device based on delta data.

In detail, in operation 1140, the map data providing method may generate delta data by comparing old version map data and new version map data for each mesh, and may transmit the delta data to the navigation device.

The delta data may be modified spatial data associated with at least one of road network data, background data, and search data among meshes, and may be modified spatial data associated with at least one of a plurality of pieces of road network data, a plurality of pieces of background data, and a plurality of pieces of search data among the meshes.

Figure 12:
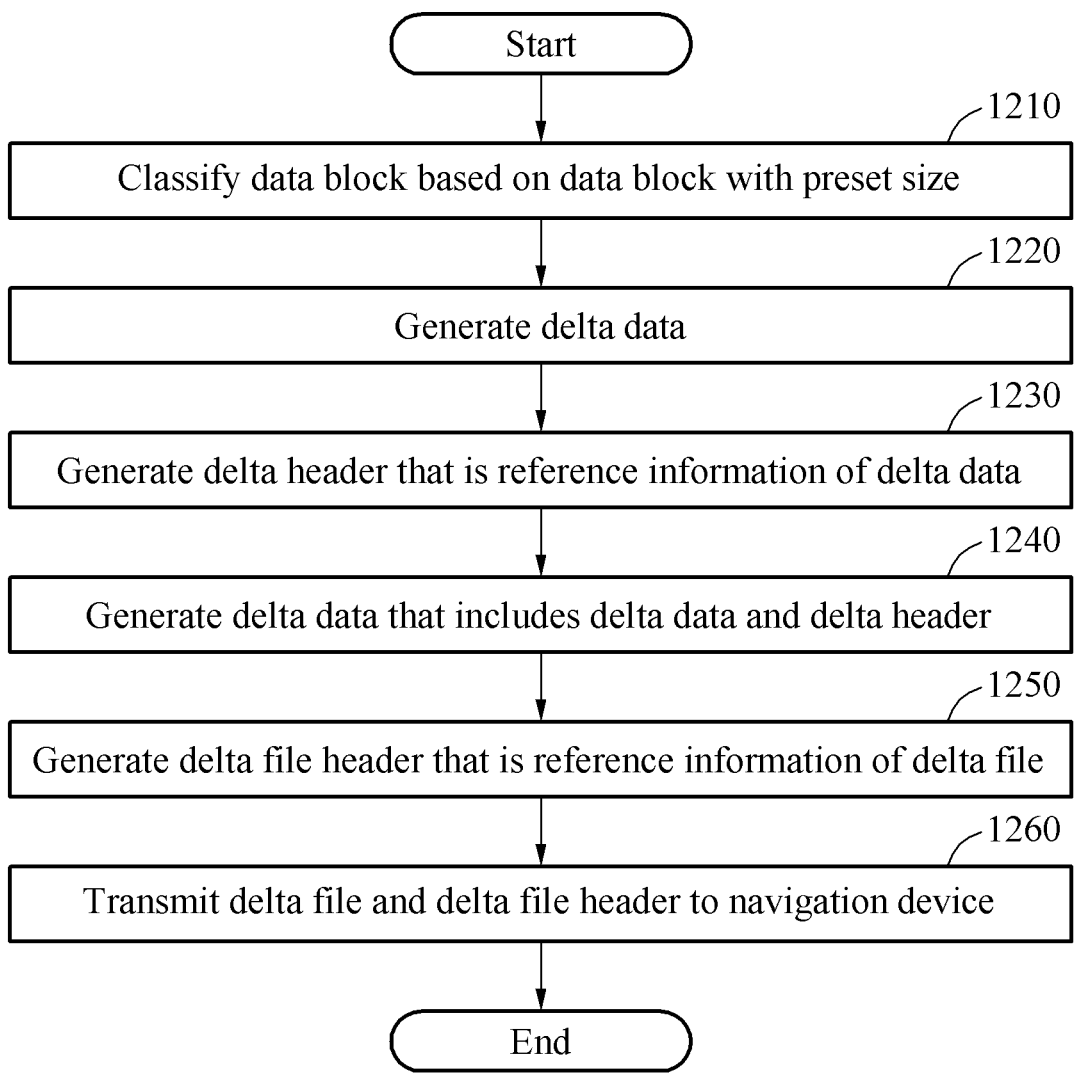
FIG. 12 is a flowchart illustrating a method of providing, at a server, map data of a navigation device according to another example embodiment.

FIG. 12 is a flowchart illustrating a method of providing, at a server, map data of a navigation device according to another example embodiment.

Referring to FIG. 12, in operation 1210, the map data providing method constructs a data section by sectioning spatial data included in each of meshes, and classifies the data section based on a data block with a preset size.

In detail, in operation 1210, the map data providing method may construct the data section by sectioning spatial data included in each of meshes that are dynamically divided based on irregular meshing, and may classify the data block into a data block based on at least one of capacity of spatial data included in each of the meshes and a size between adjacent meshes.

The data section may be constructed by sectioning spatial data that includes at least one of road network data, background data, and search data.

In operation 1220, the map data providing method generates delta data by comparing old version map data and new version map data for each mesh and by extracting only modified spatial data from the girds.

The delta data may be modified spatial data associated with at least one of road network data, background data, and search data among the meshes, and may be modified spatial data associated with at least one of a plurality of pieces of road network data, a plurality of pieces of background data, and a plurality of pieces of search data among the meshes.

In operation 1230, the map data providing method generates a delta header that is reference information of delta data based on at least one of modified spatial data, meshes, and a data block.

The delta header may be reference information that includes at least one of location address information, unique name information, and identification number information associated with at least one of modified spatial data, meshes, and a data block in map data.

In operation 1240, the map data providing method generates a delta file that includes delta data and the delta header. In detail, in operation 1240, the map data providing method may generate the delta file by including delta data, the delta header, and an error detection code for error detection.

In operation 1250, the map data providing method generates a delta file header that is reference information of the delta file.

The delta file header may include reference information that includes at least one of location address information, unique name information, and identification number information associated with the data block and frame rate information that indicates transmission capacity information of the delta file.

In operation 1260, the map data providing method transmits the delta file and the delta file header to the navigation device.

The map data providing method may further include receiving old version history information associated with old version map data from the navigation device, and generating new version history information by analyzing the old version history information and a version history table that includes version history information of the navigation device.

The old version history information may be history information associated with a data block, meshes, and spatial data of an old version recently updated at the navigation device.

The version history information may be history information associated with a data block, meshes, and spatial data of an old version recently or previously updated at the navigation device, and history information associated with a data block, meshes, and spatial data of a new version recently updated at the server.

According to an aspect, the map data providing method may generate delta data by comparing new version history information and new version map data for each mesh in operation 1220, and by extracting only modified spatial data from the meshes, and may generate a delta file header that includes the new version history information in operation 1250.

Figure 13:
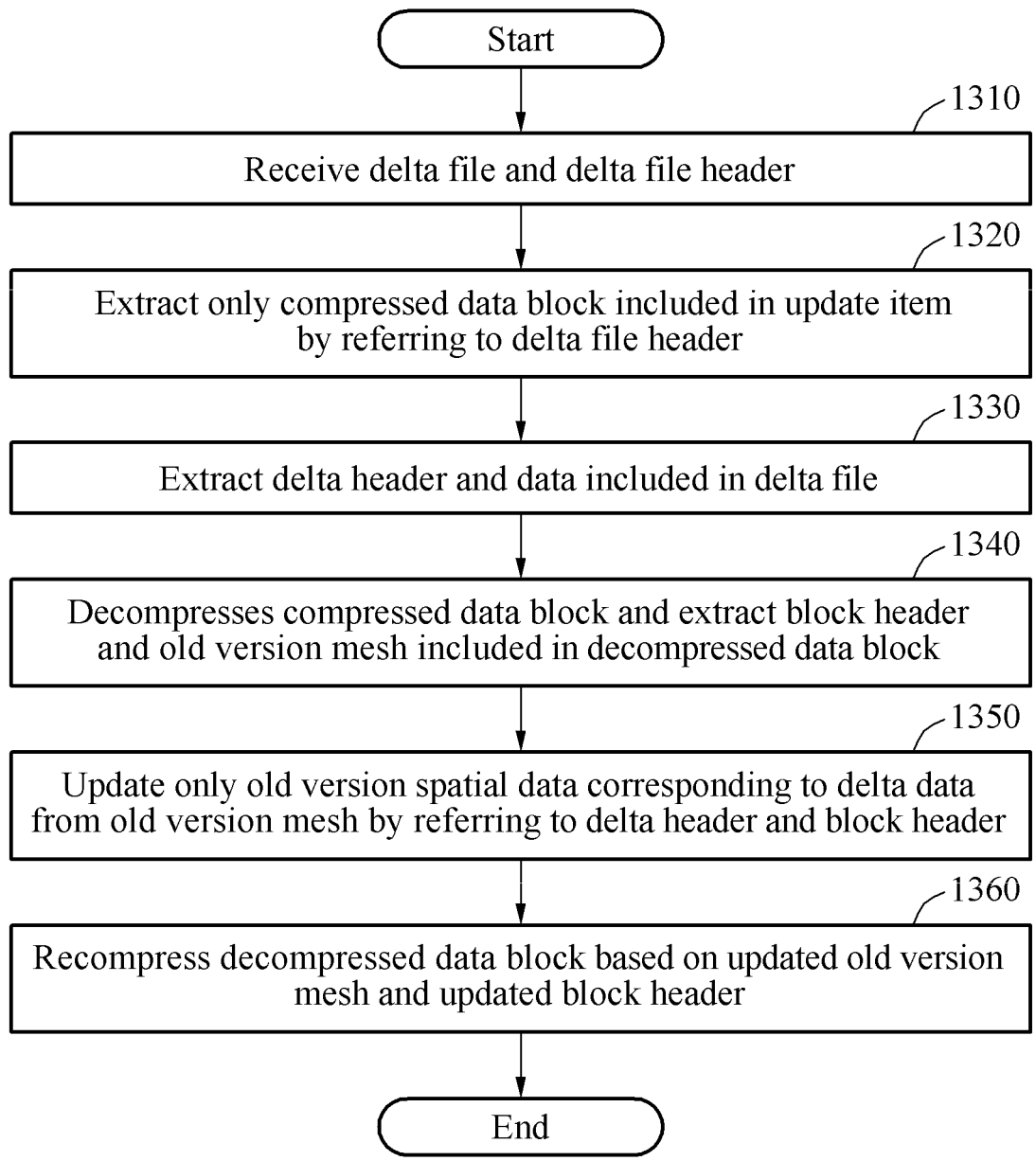
FIG. 13 is a flowchart illustrating a map data update method performed at a navigation device according to an example embodiment.

FIG. 13 is a flowchart illustrating a map data update method performed at a navigation device according to an example embodiment.

Referring to FIG. 13, in operation 1310, the map data update method receives a compressed delta file and delta file header from a server.

The delta file may be a file acquired by compressing all of or each of delta files, and the delta file header may include reference information that includes at least one of location address information, unique name information, and identification number information associated with a data block, and frame rate information that indicates transmission capacity information of the delta file.

In operation 1320, the map data update method decompresses a compressed file header included in old version map data and extracts only a compressed data block included in an update item from the old version map data by referring to the decompressed file header and delta file header.

In detail, in operation 1320, the map data update method may extract only the compressed data block corresponding to reference information of the delta file header and reference information of the decompressed file header.

The decompressed file header may be reference information that includes at least one of location address information, unique name information, and identification number information of the compressed data block.

In operation 1330, the map data update method decompresses a compressed delta file and extracts a delta header and delta data included in the decompressed delta file, and decompresses a compressed data block and extracts a block header and an old version mesh from the decompressed data block.

The delta data may be updated spatial data associated with at least one of road network data, background data, and search data among meshes, and may be updated spatial data associated with at least one of a plurality of pieces of road network data, a plurality of pieces of background data, and a plurality of pieces of search data among the meshes.

The delta header may be reference information that includes at least one of location address information, unique name information, and identification number information associated with at least one of updated spatial data, meshes, and a data block in map data.

The old version mesh may be spatial data of an old version associated with at least one of road network data, background data, and search data, and may be spatial data of an old version associated with a plurality of pieces of road network data, a plurality of pieces of background data, and a plurality of pieces of search data.

Also, the old version mesh may be constructed as a data section by sectioning spatial data of an old version that includes road network data, background data, and search data.

The block header may be reference information that includes at least one of location address information, unique name information, and identification number information associated with at least one of spatial data of the old version and meshes of the old version in map data.

Depending on example embodiments, in operation 1330, the map data update method may decompress the compressed delta file, and may extract the delta header, delta data, and an error detection code for error detection that are included in the decompressed delta file.

The map data update method may further include detecting an error for the delta header and delta data using the extracted error detection code.

In operation 1340, the map data update method updates only spatial data of the old version corresponding to the delta data in the old version mesh and updates the block header based on the delta header by referring to the delta header and the block header.

In detail, in operation 1340, the map data update method may update only spatial data of the old version associated with at least one of road network data, background data, and search data among meshes corresponding to reference information of the delta header and reference information of the block header, and may update only spatial data of the old version associated with at least one of a plurality of pieces of road network data, a plurality of pieces of background data, and a plurality of pieces of search data among meshes.

Also, in operation 1340, the map data update method may update reference information of the block header with reference information of the delta header.

In operation 1350, the map data update method recompresses the decompressed data block based on the updated old version mesh and the updated block header.

The map data update method may further include transmitting old version history information associated with old version map data to the server.

The old version history information may be history information associated with the compressed data block of the old version recently updated at the navigation device, a mesh of the old version, and spatial data of the old version.

According to an aspect, in operation 1310, the map data update method may receive, from the server, a delta file header that includes a compressed delta file and new version history information.

The new version history information may be history information that is generated by analyzing old version history information and a version history table included in version history information.

The version history information may be history information associated with a data block of an old version recently or previously updated at the navigation device, meshes of the old version, and spatial data of the old version, and history information associated with a data block of a new version recently updated at the server, meshes of the new version, and spatial data of the new version.

The map data update method may further include managing old version history information and new version history information.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, and DVDs; magneto-optical media such as optical discs and floptical disks; and hardware devices that are specially configured to store and perform program instructions, such as read-only memory (ROM), random access memory (RAM), flash memory), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of providing map data of a navigation device by a server to the navigation device, the server being configured to communicate with the navigation device over a communication network, the method comprising:

dividing, by the server, entire map data into irregular meshes, wherein a size of each mesh of the meshes decreases according to an increase in density of spatial data in the mesh;

constructing, by the server, data sections corresponding to the meshes by sectioning spatial data in each of the meshes;

classifying, by the server, the data sections into data blocks based on a size of each of the meshes, wherein the classifying the data sections is performed based on a sequential order of a size of the spatial data in each of the meshes, and a mesh having a largest size of spatial data among the meshes is classified into a first data block of the data blocks;

generating, by the server, a table that includes metadata for each data block of the data blocks, wherein the metadata includes reference information of spatial data in each of the data blocks and is used to manage map data by the server;

generating, by the server, delta data for updating the map data of the navigation device, wherein the data blocks correspond to data blocks of the map data of the navigation device, the delta data indicates spatial data modified in new version map data stored in the server in comparison to old version map data stored in the server, and the generating the delta data includes comparing the old version map data and the new version map data for each of the meshes and extracting a mesh of which data is modified from the meshes;

generating, by the server, a delta file header and a delta file, wherein the delta file header includes reference information of the delta file and frame rate information indicating transmission capacity of the delta file, the delta file includes a delta header, the delta data and an error detection code for error detection of the delta file, the delta header is reference information of the delta data, and the error detection code includes a cyclical redundancy check (CRC) code; and transmitting, by the server, the generated delta file and delta file header to the navigation device over the communication network between the server and the navigation device, wherein each of the spatial data in the mesh, the spatial data in each of the meshes, the spatial data having the largest size, the spatial data in each of the data blocks, and the modified spatial data includes at least one of road network data, background data and search data, and wherein the road network data is data associated with roads, the background data is data associated with one of a building, a facility, mountain, and sea, and the search data is data associated with at least one of address information, unique name information, search name information, identification number information, and identification coordinates information of the road network data and the background data.

2. A method of providing map data of a navigation device by a server to the navigation device, the server being configured to communicate with the navigation device over a communication network, the method comprising:

constructing, by the server, data sections corresponding to meshes of entire map data by sectioning spatial data in each of the meshes, and classifying, by the server, the data sections into data blocks based on a size of each of the meshes, wherein a size of each mesh of the meshes decreases according to an increase in density of spatial data in the mesh, and the classifying the data sections is performed based on a sequential order of a size of the spatial data in each of the meshes, and a mesh having a largest size of spatial data among the meshes is classified into a first data block of the data blocks;

generating, by the server, a table that includes metadata for each data block of the data blocks, wherein the metadata includes reference information which is associated with spatial data in each of the data blocks and is used to manage map data by the server;

generating, by the server, delta data for updating the map data of the navigation device, wherein the delta data indicates spatial data modified in new version map data stored in the server in comparison to old version map data stored in the server and the generating the delta data includes comparing the old version map data and the new version map data for each of the meshes and extracting the modified spatial data from the meshes;

generating, by the server, a delta header that is reference information of the delta data based on at least one of the modified spatial data, the meshes, and the data blocks;

generating, by the server, a delta file, wherein the delta file includes the delta data, the delta header and an error detection code for error detection of the delta file, and the error detection code includes a cyclical redundancy check (CRC) code;

generating, by the server, a delta file header that includes reference information of the delta file and frame rate information indicating transmission capacity of the delta file; and transmitting, by the server, the delta file and the delta file header to the navigation device over the communication network between the server and the navigation device, wherein each of the spatial data in each of the meshes, the spatial data having the largest size, the spatial data in each of the data blocks, and the modified spatial data includes at least one of road network data, background data and search data, and wherein the road network data is data associated with roads, the background data is data associated with one of a building, a facility, mountain, and sea, and the search data is data associated with at least one of address information, unique name information, search name information, identification number information, and identification coordinates information of the road network data and the background data.

3. The method of claim 2, further comprising:

receiving old version history information associated with the old version map data from the navigation device; and generating new version history information by analyzing the old version history information and a version history table that includes version history information of the navigation device.

4. The method of claim 3, wherein the generating of the delta data comprises generating the delta data by comparing the new version history information and the new version map data for each mesh of the meshes and by extracting the modified spatial data from the meshes, and the generating of the delta file header comprises generating the delta file header that includes the new version history information.

5. A map data update method performed by a navigation device configured to communicate with a server over a communication network, the method comprising:

receiving, by the navigation device, a delta file and a delta file header from the server over the communication network between the server and the navigation device, wherein the delta file header includes reference information of the delta file and frame rate information indicating transmission capacity of the delta file, the delta file includes a delta header, delta data and an error detection code for error detection of the delta file, the delta header includes reference information of the delta data, and the delta data indicates spatial data modified in new version map data stored in the server in comparison to old version map data stored in the server and is generated by the server using a file generation algorithm;

extracting, by the navigation device, the delta header and the delta data from the delta file received from the server, decompressing, by the navigation device, a compressed file header of old version map data stored in the navigation device, extracting, by the navigation device, a compressed data block including a block header and an old version mesh from the old version map data stored in the navigation device by referring to the decompressed file header and the delta file header;

decompressing, by the navigation device, the compressed data block, and extracting, by the navigation device, the block header and the old version mesh included in the decompressed data block;

updating, by the navigation device, old version spatial data included in the old version mesh of the decompressed data block and corresponding to the delta data of the delta file received from the server by referring to the extracted block header and the delta file header received from the server, and updating the block header in the decompressed data block based on the delta header of the delta file received from the server; and recompressing, by the navigation device, the decompressed data block based on the updated old version spatial data and the updated block header, wherein each of the spatial data modified in the new version map data and the old version spatial data includes at least one of road network data, background data and search data, wherein the road network data is data associated with roads, the background data is data associated with one of a building, a facility, mountain, and sea, and the search data is data associated with at least one of address information, unique name information, search name information, identification number information, and identification coordinates information of the road network data and the background data, and wherein the method further comprises extracting, by the navigation device, the error detection code for error detection of the delta file from the delta file, detecting, by the navigation device, an error associated with the delta header and the delta data based on the extracted error detection code, and correcting, by the navigation device, the detected error, and wherein the error detection code includes a cyclical redundancy check (CRC) code.

6. The method of claim 5, wherein the receiving of the delta file and the delta file header comprises receiving, from the server, the delta file header that includes new version history information.

7. The method of claim 6, further comprising:
transmitting old version history information associated with the old version map data to the server; and
managing the old version history information and the new version history information.

* * * * *